US006669853B2

(12) United States Patent
Charkhutian et al.

(10) Patent No.: US 6,669,853 B2
(45) Date of Patent: Dec. 30, 2003

(54) COMPOSITION FOR REMOVING DISSOLVED OXYGEN FROM A FLUID

(75) Inventors: Kostan B. Charkhutian, Westwood, NJ (US); Bruce L. Libutti, Teaneck, NJ (US); Frank L. M. De Cordt, Ranst (BE); Martti Samuli Ahomäki, Tuusula (FI)

(73) Assignee: Ashland Inc., Covington, KY (US)

( * ) Notice: Subject to any disclaimer, the term of this patent is extended or adjusted under 35 U.S.C. 154(b) by 0 days.

(21) Appl. No.: 09/927,844

(22) Filed: Aug. 9, 2001

(65) Prior Publication Data
US 2003/0047520 A1 Mar. 13, 2003

(51) Int. Cl.⁷ .................................................. C02F 1/70
(52) U.S. Cl. ........................ 210/750; 210/757; 252/178; 252/180
(58) Field of Search ................................ 252/175, 178, 252/180; 210/696, 750, 757

(56) References Cited

U.S. PATENT DOCUMENTS

| 4,067,690 | A | | 1/1978 | Cuisia et al. |
| 4,350,606 | A | | 9/1982 | Cuisia et al. |
| 4,487,745 | A | | 12/1984 | Weiss et al. |
| 5,176,849 | A | | 1/1993 | Hwa et al. |
| 5,489,718 | A | * | 2/1996 | Arhancet |
| 5,587,109 | A | * | 12/1996 | Greaves et al. |
| 5,714,118 | A | * | 2/1998 | Scheurman, III |
| 5,830,383 | A | * | 11/1998 | Greaves et al. |
| 6,059,992 | A | * | 5/2000 | Veldman et al. |

* cited by examiner

*Primary Examiner*—Betsey Morrison Hoey
(74) *Attorney, Agent, or Firm*—David L. Hedden

(57) ABSTRACT

This invention relates to compositions, which are useful in removing dissolved oxygen from a fluid stream, preferably an aqueous stream. The compositions comprise blend of an oxime and a primary hydroxylamine. This invention also relates to a process for removing oxygen from an aqueous system, which comprises adding an oxime and a primary hydroxylamine to a fluid system.

11 Claims, No Drawings

COMPOSITION FOR REMOVING DISSOLVED OXYGEN FROM A FLUID

CROSS-REFERENCE TO RELATED APPLICATIONS

Not Applicable.

CLAIM TO PRIORITY

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

This invention relates to compositions, which are useful in removing dissolved oxygen from a fluid stream, preferably an aqueous stream. The compositions comprise a blend of an oxime and a primary hydroxylamine. This invention also relates to a process for removing oxygen from an aqueous system, which comprises adding an oxime and a primary hydroxylamine to a fluid system.

2. Description of the Related Art

The presence of dissolved oxygen in industrial/institutional water systems, such as steam generating systems, causes the cathode of corrosion cells to depolarize and prolong the corrosion process. Additionally dissolved oxygen promotes ammonia corrosion of copper condenser tubes and chelant corrosion of metal tubes and pump parts.

The mitigation of corrosion in steam generating systems is vital to the continued efficient operation of the systems. Oxygen pitting can rapidly lead to failures while formation of metal oxides results in deposition, causing reduced heat transfer rates and under-deposit corrosion. The limited deposit tolerances in boilers require that the corrosion inhibition program perform optimally. Therefore, it is essential that dissolved oxygen concentrations be kept at the lowest level possible throughout the steam generating system.

In most steam generating systems, the reduction or elimination of oxygen is achieved by mechanical means, followed by the addition of chemicals, which are known in the industry as oxygen scavengers. Methyl ethyl ketoxime (MEKO) is well known as an oxygen scavenger and metal passivator in boilers. See U.S. Pat. No. 4,487,745. This patent indicates that the amount of oxime used in treating boiler water is from 0.0001 ppm to 500 ppm, although commercial utility plant experience indicates that the typical dosage of MEKO used to control feedwater oxygen is from 30–80 ppb. MEKO controls corrosion in the feedwater circuit by scavenging oxygen and by establishing a corrosion-resistant oxide film on waterside metallic surfaces.

One limitation in using MEKO is that it requires thermal activation. Because thermal activation is necessary, MEKO is not useful for certain applications, for instance shipboard boiler systems without heated deaeration or adequate feedwater heating, or boilers in layup.

Another known oxygen scavenger is a secondary hydroxylamine, diethyl hydroxylamine (DEHA). See U.S. Pat. Nos. 4,067,690 and 4,350,606.

All citations referred to under this description of the "Related Art" and in the "Detailed Description of the Invention" are expressly incorporated by reference.

BRIEF SUMMARY OF THE INVENTION

This invention relates to a composition comprising (a) an oxime, preferably methyl ethyl ketoxime (MEKO) and (2) primary hydroxylamine, preferably isopropylhydroxylamine (IPHA). The examples indicate that the use of this composition provides unexpected, or synergistic, results, in view of the limited effect of the components alone in scavenging oxygen, particularly at ambient temperatures.

Test data indicate that there is a synergy when MEKO and IPHA are used together, since the effectiveness of this combination in removing dissolved oxygen was unexpected in view of their effectiveness when used individually. This degree of dissolved oxygen removal was not expected in view of the performance of MEKO and IPHA alone, particularly since the test was not carried out at a temperature that would activate the MEKO. The effectiveness of the invention is further surprising because mixing methyl ethyl ketoxime (MEKO) with a secondary hydroxylamine, e.g. diethylhydroxylamine (DEHA), does not significantly improve the oxygen scavenging ability of MEKO.

Although the composition can be used in any steam generating system, the composition is particularly useful where temperatures are insufficient to activate MEKO. Examples are certain boiler systems such as shipboard auxiliary boilers, or boilers in layup.

This invention also relates to a process for removing oxygen from an aqueous system, which comprises adding an oxime and a primary hydroxylamine to a fluid system, preferably an aqueous system, in amount effective to remove dissolved oxygen that is in contact with the aqueous system. The oxime and primary hydroxylamine can be fed into the fluid stream as a mixture or separately. When the oxime and primary hydroxylamine are fed into the fluid stream, the oxime, preferably methyl ethyl ketoxime, will scavenge oxygen at ambient temperature, which is surprising in view of what is known about methyl ethyl ketoxime.

The process further involves maintaining the dosage of oxime in the aqueous system for a time sufficient to further reduce the level of oxygen in the aqueous system. The process can be carried out effectively at ambient temperatures. The corrosion potential for the boiler tube surfaces is also reduced when this process is used. The use of this process also results in cost savings because there is less need for frequent cleanings of the operating equipment, i.e. boiler, if the process is used. Further savings result by using this process because heat generated by the boiler is more efficient.

BRIEF DESCRIPTION OF THE SEVERAL VIEWS OF THE DRAWINGS

Not Applicable.

DETAILED DESCRIPTION OF THE INVENTION

The detailed description and examples will illustrate specific embodiments of the invention will enable one skilled in the art to practice the invention, including the best mode.

The oximes used in this process are described in U.S. Pat. No. 4,487,745 which is hereby incorporated by reference and shown by the following chemical structure:

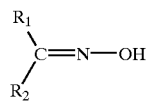

wherein $R_1$ and $R_2$ are the same or different and are selected from hydrogen, lower alkyl groups of 1–8 carbon atoms and aryl groups, and mixtures thereof, particularly aliphatic oximes. Most preferably used as the oxime is methyl ethyl ketoxime (MEKO). Although not required, the oxime is can be added to a feedpoint that will expose the said methyl ethyl ketoxime to a temperature of about 30° C. to about 320° C.

The primary hydroxylamines used in this invention have the following structural formula:

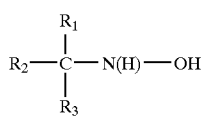

wherein $R_1$, $R_2$, and $R_3$ are the same or different and are selected from hydrogen, lower alkyl groups of 1–8 carbon atoms, aryl groups, arylalkyl groups, and mixtures thereof, preferably aliphatic primary hydroxylamines, most preferably isopropyl hydroxylamine (IPHA).

The ratio of oxime to primary hydroxylamine is typically from about 100:1 to about 1:10, preferably from about 20:1 to about 1:1 most preferably from about 10:1 to about 2:1. The typical dosage of the composition is used in an aqueous system with thermal and/or mechanical deaeration for a feedwater (for a boiler which is in operation) oxygen scavenging is in the range of 30 ppb to 300 ppb, preferably from about 30 ppb to 150 ppb, most preferably from about 65 ppb to 100 ppb. The typical dosage of the composition used in an aqueous system without thermal and/or mechanical deaeration for a feedwater (for a boiler which is in operation) is in the range of 5 to 200 ppm, preferably from about 15 ppm to 120 ppm, most preferably from about 15 ppm to 60 ppm. For boilers in layup, the typical dosage of the composition is used in the range of 5 to 200 ppm, preferably from about 5 ppm to 120 ppm, most preferably from about 5 ppm to 60 ppm.

Although it is not critical to inject the composition into a particular injection point, typical injection points where the composition can be added to an aqueous stream of a steam generator include the pre-boiler system of the steam generator, the boiler steam drum of the steam generator, the highest-temperature feedwater heater extraction steam of the lower pressure steam turbine, the main steam header prior to the turbine, the turbine crossover piping, and satellite feeds to stream condensate lines.

EXAMPLE

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof.

Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. The Control did not contain MEKO or IHPA. Sample compositions A–D are comparative examples. They contain either IPHA or MEKO, but not both.

Examples A–D and 1–2

Dissolved oxygen and pH were monitored on sample compositions at ambient temperature in order to evaluate the effectiveness of the compositions in scavenging dissolved oxygen. The monitoring system consisted of Hach D175 dissolved oxygen meter equipped with a probe, Cole-Parmer pH meter equipped with a pH and ATC probes, a four-neck round bottom flask and a stirrer. The evaluations were done by adding known amounts of MEKO, IPHA and a blend of MEKO and IPHA to oxygen saturated DI water. The pH of the test solutions were maintained at 10.00–10.25 using dilute sodium hydroxide solution. Reagent grade methyl ethyl ketoxime (MEKO)[1] was used in the evaluation. A product called Hydroguard I-15, which is a 15% solution of isopropyl hydroxylamine supplied by Angus Chemical Company/Dow Chemical Company was used as the source for the IPHA.

[1] Ashland Specialty Chemical Company markets MEKO as MEKOR® corrosion inhibitor.

Table I shows dissolved oxygen data over time for two levels of MEKO, IPHA, and a blend of MEKO and IPHA.

[1] Ashland Specialty Chemical Company markets MEKO as MEKLOR® corrosion inhibitor.

TABLE I

| Example | MEKO (ppm) | IHPA (ppm) | Ratio MEKO/IPHA | % Oxygen Remaining (Time in minutes) | | | |
|---------|------------|------------|-----------------|------|------|------|------|
|         |            |            |                 | 0    | 10   | 20   | 30   |
| Control | 0          | 0          | —               | 100.0 | 100.0 | 100.0 | 100.0 |
| A       | 22.5       | 0          | —               | 100.0 | 100.4 | 100.0 | 99.3 |
| B       | 0          | 2.3        | —               | 100.0 | 48.1 | 50.9 | 53.9 |
| 1       | 23.1       | 2.4        | 9.6             | 100.0 | 44.9 | 35.3 | 35.8 |
| C       | 35.7       | 0          | —               | 100.0 | 100.3 | 100.5 | 100.0 |
| D       | 0          | 3.5        | —               | 100.0 | 52.9 | 52.8 | 55.3 |
| 2       | 32.9       | 3.4        | 9.7             | 100.0 | 52.2 | 31.5 | 22.8 |

The data in Table I show that MEKO does not scavenge oxygen at ambient temperature. Additionally the data show that the combination of MEKO and IPHA removes more oxygen than IPHA or MEKO alone. The data indicate that there is a synergy when MEKO and IPHA are used together, since the effectiveness of this combination in removing dissolved oxygen was unexpected in view of their effectiveness when used individually. This degree of dissolved oxygen removal was not expected in view of the performance of MEKO and IPHA alone, particularly since the test was not carried out at a temperature that would activate the MEKO.

We claim:

1. A process for removing dissolved oxygen from an aqueous system comprising:
    adding a composition to said aqueous system comprising:
        (a) methyl ethyl ketoxime; and
        (b) a primary hydroxylamine,
    such that the weight ratio of (a) to (b) is from about 100:1 to about 1:10, in amount effective to remove dissolved oxygen from the aqueous system, whereby the process is carried out at ambient temperature.

2. The process of claim 1 wherein the composition is injected into an aqueous stream of the preboiler section of a steam generating system with an operating boiler.

3. The process of claim 2 wherein the injection point for the composition is the feedwater of the preboiler.

4. The process of claim 3 wherein there is mechanical deaeration.

5. The process of claim 3 wherein dosage of the composition is from 30 ppb to 300 ppb.

6. The process of claim 3 wherein there is no provision for mechanical deaeration.

7. The process of claim 6 wherein dosage of the composition is from 5 ppm to 200 ppm.

8. The process of claim 1 wherein the composition is injected into the water contained in a boiler in layup.

9. The process of claim 8 wherein the dosage of the composition is from 5 ppm to 200 ppm.

10. The process of claim 1 wherein the primary hydroxylamine is isopropyl hydroxylamine.

11. The process of claim 10 wherein the weight ratio of (a) to (b) is from 10:1 to about 2:1.

* * * * *